(12) United States Patent
Vantalon et al.

(10) Patent No.: US 8,010,983 B1
(45) Date of Patent: Aug. 30, 2011

(54) METHOD AND APPARATUS FOR ENABLING SWITCHED VIDEO SERVICE ON A HOST MEDIA SERVER

(75) Inventors: Luc Vantalon, Los Altos, CA (US); Paolo Siccardo, Los Altos, CA (US)

(73) Assignee: Digital Keystone, Inc., Mountain View, CA (US)

( * ) Notice: Subject to any disclaimer, the term of this patent is extended or adjusted under 35 U.S.C. 154(b) by 659 days.

(21) Appl. No.: 12/217,366

(22) Filed: Jul. 2, 2008

(51) Int. Cl.
*H04N 7/16* (2011.01)
*H04N 7/173* (2011.01)

(52) U.S. Cl. .......................... 725/82; 725/119; 725/133

(58) Field of Classification Search .................. None
See application file for complete search history.

(56) References Cited

U.S. PATENT DOCUMENTS

| 6,732,179 | B1* | 5/2004 | Brown et al. | 709/229 |
| 2003/0193619 | A1* | 10/2003 | Farrand | 348/731 |
| 2007/0186259 | A1* | 8/2007 | Pedlow et al. | 725/120 |
| 2008/0127277 | A1* | 5/2008 | Kuschak | 725/74 |
| 2008/0229379 | A1* | 9/2008 | Akhter | 725/139 |
| 2009/0119728 | A1* | 5/2009 | Broberg | 725/114 |
| 2009/0175296 | A1* | 7/2009 | P et al. | 370/466 |

OTHER PUBLICATIONS

OpenCable; Tuning Resolver Interface Specification; OC-SP-TRIF-IO2-080519; All Pages.*
OpenCable; Digital Receiver Interface Protocol Specification; OC-SP-DRI-IO2-060210; All Pages.*
OpenCable; OpenCable Unidirectional Receiver; OC-SP-OCUR-IO7-080620; All Pages.*

* cited by examiner

*Primary Examiner* — Andrew Y Koenig
*Assistant Examiner* — Carmine Malangone
(74) *Attorney, Agent, or Firm* — Blakely, Sokoloff, Taylor & Zafman LLP

(57) ABSTRACT

Methods and apparatuses are disclosed to enable switched video service on a host media server using a component within the media server to relay messages between a set of one or more tuners coupled with the media server and an interpreter device connected to a network source node that allocates switched video channels.

27 Claims, 10 Drawing Sheets

Conventional
Method
500

Method
600

METHOD AND APPARATUS FOR ENABLING SWITCHED VIDEO SERVICE ON A HOST MEDIA SERVER

FIELD OF THE INVENTION

The invention relates generally to providing multimedia services to a data processing system over a cable network. More specifically, the invention relates to providing switched video services on a host media server data processing system.

BACKGROUND OF THE INVENTION

Modernly, coaxial cable is a very popular medium over which cable operators chose to transmit their cable TV and Internet services to residential subscribers. Most homes today are equipped with coaxial cable connections. Coaxial cable is an electrical cable consisting of an inner conductor or several un-insulated conductors tightly twisted together, often surrounded by an insulating spacer, surrounded by an outer cylindrical conducting shield, and usually surrounded by a final insulating layer. The term coaxial comes from the inner conductor and the outer shield sharing the same axis. Coaxial cable is often used as a high-frequency transmission line to carry broadband signals into a subscriber's home.

However, there is a significant bandwidth limitation to coaxial cable. Only so many channels may be supported by a given coaxial cable. For example, the typical coaxial cable only supports between 60 and 120 analog channels or 120 to 240 high definition digital channels, or a mix of the two. Since coaxial cable is used for many different services such as cable TV and Internet services, there is a demand for efficient use of the existing coaxial cable bandwidth. As a result, cable systems are now providing more and more programming through the use of a technology known as switched video or switched digital video (SDV). Switched video is a network scheme for distributing video via a cable with limited capacity such as coaxial cable. Switched video sends the digital video in a more efficient manner so that additional uses may be made of the freed-up bandwidth. FIG. 1A illustrates a diagram of how switched video saves bandwidth where channels are transmitted via a cable company's coaxial cable. In FIG. 1A, the video signal is received by the network node 104 from the video headend 101 via a distribution hub 102. Note that the amount of video channels 106 and 108 received over coaxial cables 105 and 107, respectively, is the same. However, the switched video cable 107 only needs to receive the requested channels 108, whereas the non-switched video cable 105 receives the requested channels 106 as well as many unwanted channels.

Basically, switched video involves switching from many video channels on an incoming fiber optic cable to only a few channels that are being consumed by subscribers at any given time. In current fiber-coaxial systems, a fiber optic network extending from the operator's central office carries all the available video channels (e.g., 500 channels) out to a fiber optic node or "node" which services any number of homes ranging from 1 to 2000 homes. From this point, all channels are sent via coaxial cable to each of the homes. Note that only a percentage of these homes are actively watching channels at a given time. Rarely are all channels being accessed by the homes in the service group. In a switched video system, the unwatched channels do not need to be sent over the coaxial cable to the subscribers. If a channel is not currently being transmitted on the coaxial line, the distribution hub allocates a new channel and transmits the new channel to the coaxial cable via the node. If there are multiple subscribers tuning to the same broadcast station, the node will switch the station onto only one channel of the coaxial cable and all the subscribers' cable systems will tune to that frequency. Effectively, in switched video all the subscribers tuning to the same station piggy-back onto one channel of the coaxial cable. In the extreme case where all the subscribers grouped to a particular node are tuned to the same station (e.g., during the Super bowl or an important Presidential debate), only one channel of the coaxial cable will be used for all of the subscribers. On the other hand, if a particular broadcast station is not being consumed by at least one subscriber, the node will remove the station from the channels of the coaxial cable going into the subscribers' homes. In this way, the available channels on the coaxial cable are only utilized when needed.

For a switched video system to work on today's cable systems, all digital television users in a subscription group must have devices capable of communicating with the node in a compatible manner. This enhanced switched video service requires the use of two-way direct communications with the node using reverse transmitters and proprietary signaling of the cable systems. That is, the cable systems located at the subscribers' homes must be capable of communicating with the node and vice versa.

However, most consumer electronics devices such as digital video recorders (e.g., TIVO), high-definition televisions (HDTV), and Home Theater Computers (e.g., Media Centers) available on the market today do not have two-way communication capability and cannot communicate back to the node. These consumer electronic devices may be collectively referred to as Unidirectional Cable Products (UDCPs) since they are equipped with CableCARDs that can only listen to communications, and cannot respond back to the node. UDCPs built according to applicable FCC rules are unable to access switched video services due to the prohibition on reverse transmitters within these products. Manufacturers of UDCPs would like to enable users of their products to be able to take advantage of switched video programming. However, since there is currently no nationwide standard for two-way communications for the purpose of switching video today, it is not possible to design a new retail product which can be sold in any geographical location that will support switched video. As a result, the conversion to switched video may require many years to complete.

As an interim solution, a device known as a Tuning Resolver (TR) has been developed as a way to enable access to switched video services on UDCP products. The TR is an interpreting device that sits in between the UDCP device and the node. This TR provides the necessary reverse transmitter and private signaling necessary to communicate SDV tuning requests to the node. That is, the TR "resolves" the tuning information for every tune-request from a user of a UDCP and provides detailed information to the UDCP to enable access to these services. FIG. 1B illustrates a conventional system to enable switched video services on UDCP devices using a Tuning Resolver according to the prior art. In FIG. 1B, the TR 113 has two interfaces. The first interface connects to the node 104 by plugging into the coaxial cable from the node. The TR 113 lets the signal on the coaxial cable through to the UDCP 114 so that the UDCP 114 can receive the cable RF signal 116. The other interface is a connection between the TR 113 and the UDCP 114. This connection is typically a Universal Serial Bus (USB) interface that translates simple commands from the UDCP 114 over a USB 115 (such as programming that the user of the UDCP selects) to the correct protocol that the node 104 understands. The TR 113 connects in-line with the RF signal 116 from the cable system node 104 to the UDCP 115 and utilizes a USB 115 interface for additional communications between the node 104 and the UDCP 115. These additional communications are defined by a Tuning Resolver Interface (TRIF) Specification 117 (OC-SP-TRIF-101-080130). The TRIF specification provides the technical details on the communications interface between tuners with CableCards such as UDCPs and a Tuning Resolver.

FIG. 1C illustrates a conventional system to enable switched video services on a host media server such as a Media Center personal computer (PC) via an OpenCable Unidirectional Receiver (OCUR) using a Tuning Resolver according to the prior art. An OCUR is defined in the specification OC-SP-OCUR-107-080620 and is a receiver used to tune the desired broadcast channel on the network and to stream the content to the media server. In the case of the OCUR of FIG. 1C, this OCUR has been modified to implement the TRIF specification, and hence, can request switched digital video. The term "media center" refers either to a dedicated computer appliance or to specialized PC software, both of which are adapted for playing various kinds of media (music, movies, photos etc.). A media center may also allow receiving and recording cable television broadcasts. For receiving cable television broadcasts, an OCUR is used in conjunction with the media server. The OCUR is a receiver used to tune to the desired broadcast channel on the network and to stream the content to the media server. TR 113 in FIG. 1C is the same as that illustrated in FIG. 1B. Accordingly, TR 113 has two interfaces. The first interface connects to the node 104 by plugging into the coaxial cable from the node. The TR lets the signal on the coaxial cable through to the OCUR 119 so that the OCUR 119 can receive the cable RF signal 116. The other interface is a connection between the TR 113 and the OCUR 119. This connection is typically a Universal Serial Bus (USB) interface that translates simple commands from the OCUR 119 over a USB 115 to the correct protocol that the node 104 understands. The TR 113 connects in-line with the RF signal 116 from the cable system node 104 to the OCUR 119 and utilizes a USB 115 interface for additional communications between the node 104 and OCUR 119. These additional communications are defined by the TRIF Specification 117 as illustrated in FIG. 1B. Additionally, communications between the OCUR 119 and the Host Media Server 121 may occur across a USB connection or any other data bus (i.e., Ethernet, wireless). The protocol over such data buses is Digital Receiver Interface (DRI 1.0) as defined by CableLabs like TRIF. A system such as shown in FIG. 1C requires a significant and costly modification to the OCUR to implement the TRIF specification.

BRIEF DESCRIPTION OF THE DRAWINGS

A better understanding of at least certain embodiments of the invention can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

Figure 2:
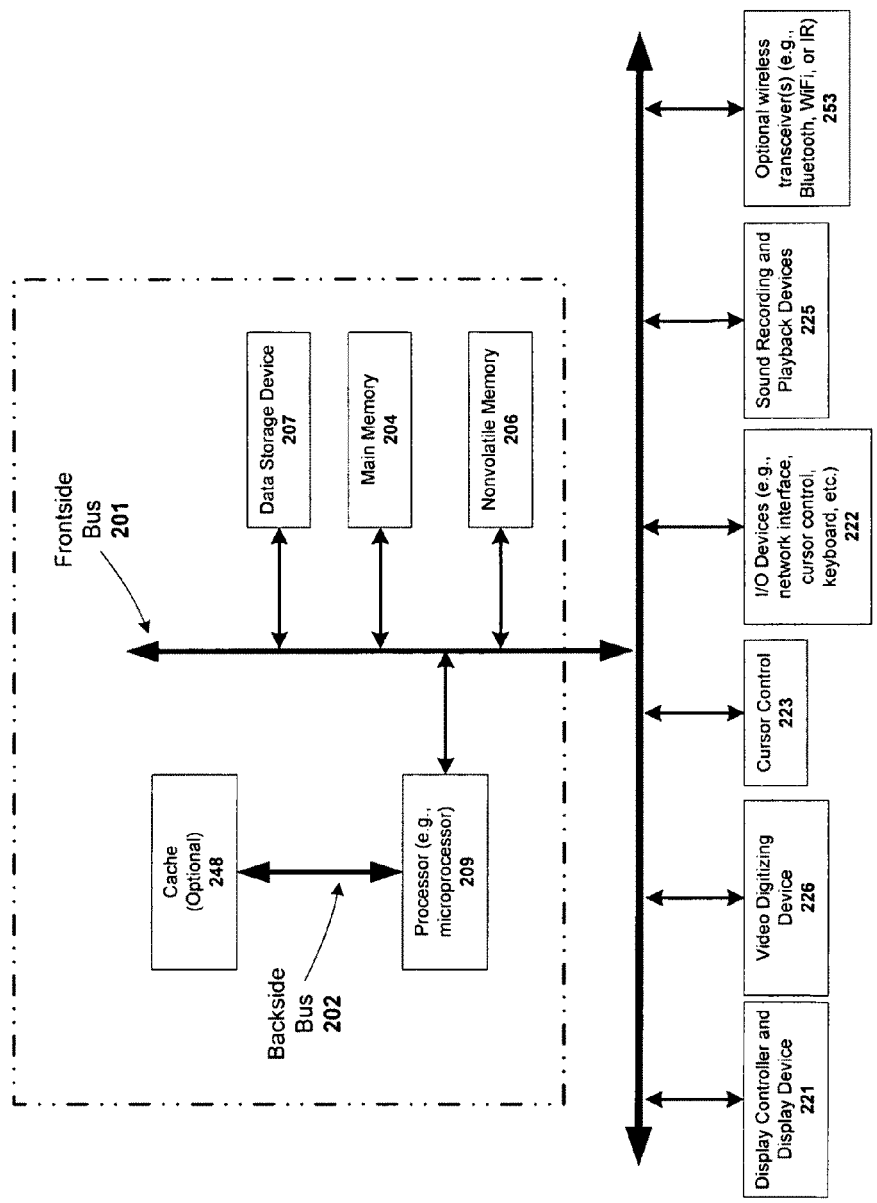
FIG. 2 illustrates an exemplary data processing system upon which the methods and apparatuses of the invention may be implemented.

A method and apparatus for enabling switched video services on a data processing system are described. FIG. 2 illustrates an exemplary data processing system upon which embodiments of the present invention can be implemented. Computer system 200 comprises front-side bus 201 and back-side bus 202 (or other communications hardware and software for communicating information) coupled to processor 209 for processing information. Front-side bus 201 is a data path which runs between the CPU and main memory (RAM). Front-side bus 201 also couples data storage device 207, main memory 204, and non-volatile memory 206 to processor 209. Additionally, front-side bus 201 connects to an external bus coupling the processor to display controller and device 221, video digitizing device 226, cursor control device 223, input-output (I/O) devices 222, sound recording and playback devices 225, and optional wireless transceivers 253. Additionally, cache 248 is coupled to processor 209 via back-side bus 202. A back-side bus, such as, back-side bus 202, is the data path and physical interface between the processor and the L1 and/or L2 cache memory (not shown).

Computer system 200 further comprises a random access memory (RAM) or other dynamic storage device (referred to as main memory 204) coupled to bus 201 for storage information and instructions to be executed by processor 209. Main memory 204 also may be used for storing temporary variables or other intermediate information during execution of instructions by processor 209. Computer system 200 also comprises a read only memory (ROM) 206, and/or static storage devices coupled to bus 201 for storing static information and instructions for processor 209. Data storage device 207 is coupled to bus 201 for storing information and instructions.

Furthermore, data storage device 207 may include a magnetic disk or optical disk and its corresponding disk drive, which can be coupled to computer system 200. This data storage device 206 or other storage devices may record the video received through operation of the TR bridge 315 described below. Computer system 200 can also be coupled, via bus 201, to display device 221 for displaying information to a computer user. Display device 221 typically includes a frame buffer, specialized graphics rendering devices, and a cathode ray tube (CRT) and/or a flat panel display. I/O device 222 including alpha numeric and other keys, is typically coupled to bus 201 for communication information and commands to processor 209. Another type of user input device is cursor control 223, such as a mouse, trackball, pin, touch screen, or cursor direction keys for communication direction information and command selections to processor 209 and for controlling cursor movement on display device 221. This input device typically has two degrees of freedom into axis, a first axis (e.g., x) and a second axis (e.g., y), which allows the device to specify positions in a plane. However, this invention should not be limited to input devices with only two degrees of freedom.

Another device that may be coupled to bus 201 is a device for sound recording and/or playback 225, such as an audio digitizer coupled to a microphone for recording information. Further, the device may include a speaker which is coupled to a digital-to-analog (D/A) converter for playing back the digitized sounds.

Also computer system 200 can be a terminal in a computer network (e.g., a LAN). Computer system 200 would then be a computer subsystem of a computer system including a number of networked devices. Computer system 200 optionally includes video digitizing device 226. Video digitizing device 226 can be used to capture video images and transmitted from others on the computer network.

Computer system 200 is useful for supporting computer supported cooperation (CSC—the integration of teleconferencing with mixed media data manipulation) to 2D/3D graphics, image processing, video compressions and/or decompression recognition algorithms and audio manipulation.

It will be understood that the various embodiments described herein may be implemented with data processing systems which have more or fewer components than system 200; for example, such data processing systems may be a cellular telephone or a personal digital assistant (PDA) or an entertainment system or a media player (e.g., an iPod) or a consumer electronic device, etc., each of which can be used to implement one or more of the embodiments of the invention.

Figure 3:
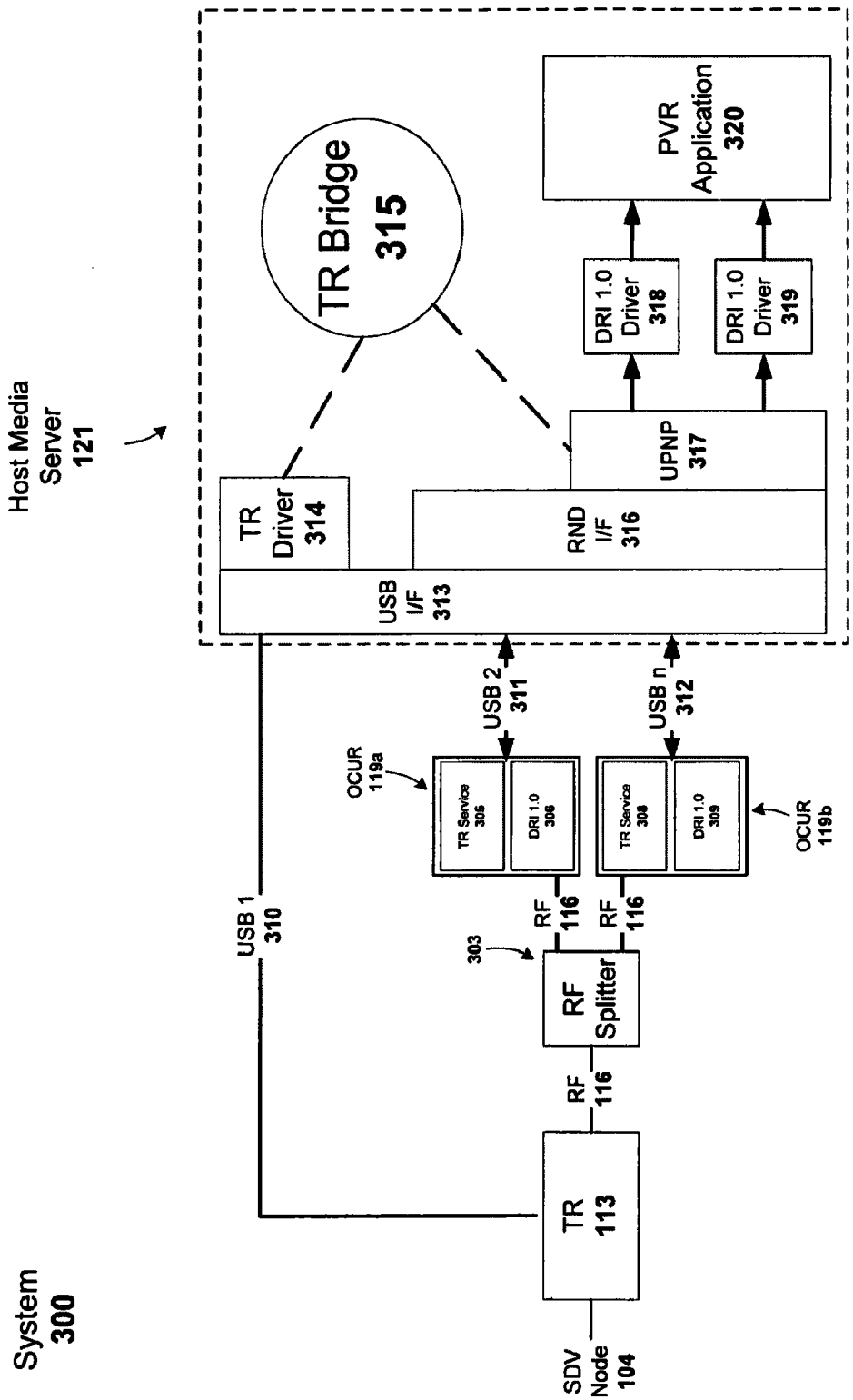
FIG. 3 illustrates a conceptual model of an exemplary system for enabling switched video service on a Host Media Server according to one embodiment of the invention.

One such data processing device is a media server such as a media center PC. FIG. 3 illustrates a conceptual model of an exemplary system for enabling switched video service on a Host Media Server according to one embodiment of the invention. In the illustrated embodiment, system 300 of FIG. 3 includes host media server 121. Host media server 121 includes multiple USB interfaces (USB I/F) 313, a Tuning Resolver (TR) driver 314, a TR Bridge component 315, a Remote Network Driver Interface (RND I/F) 316, and a Universal Plug and Play (UPnP) component 317 coupled with a Personal Video Recorder (PVR) application 320 via DRI 1.0 drivers 318 and 319.

System 300 further includes a switched video network node 104. In at least certain embodiments, switched video node 104 is a fiber optic network node which may be coupled to the TR 113 through a coaxial cable. The Tuning Resolver (TR) 113 is coupled between the network node 104 and an OpenCable Unidirectional Receivers (OCURs) 119a and 119b through RF splitter 303. The OCURs in system 300 do not need to be hardware modified to implement the TRIF specification, and hence, the OCURs in system 300 are different than the OCUR 119 in FIG. 1C. In the illustrated embodiment, the OCURs 119a and 119b are further coupled to the host media server 121 over USB I/F 313 via the Digital Receiver Interface drivers 318 and 319.

Figure 1A:
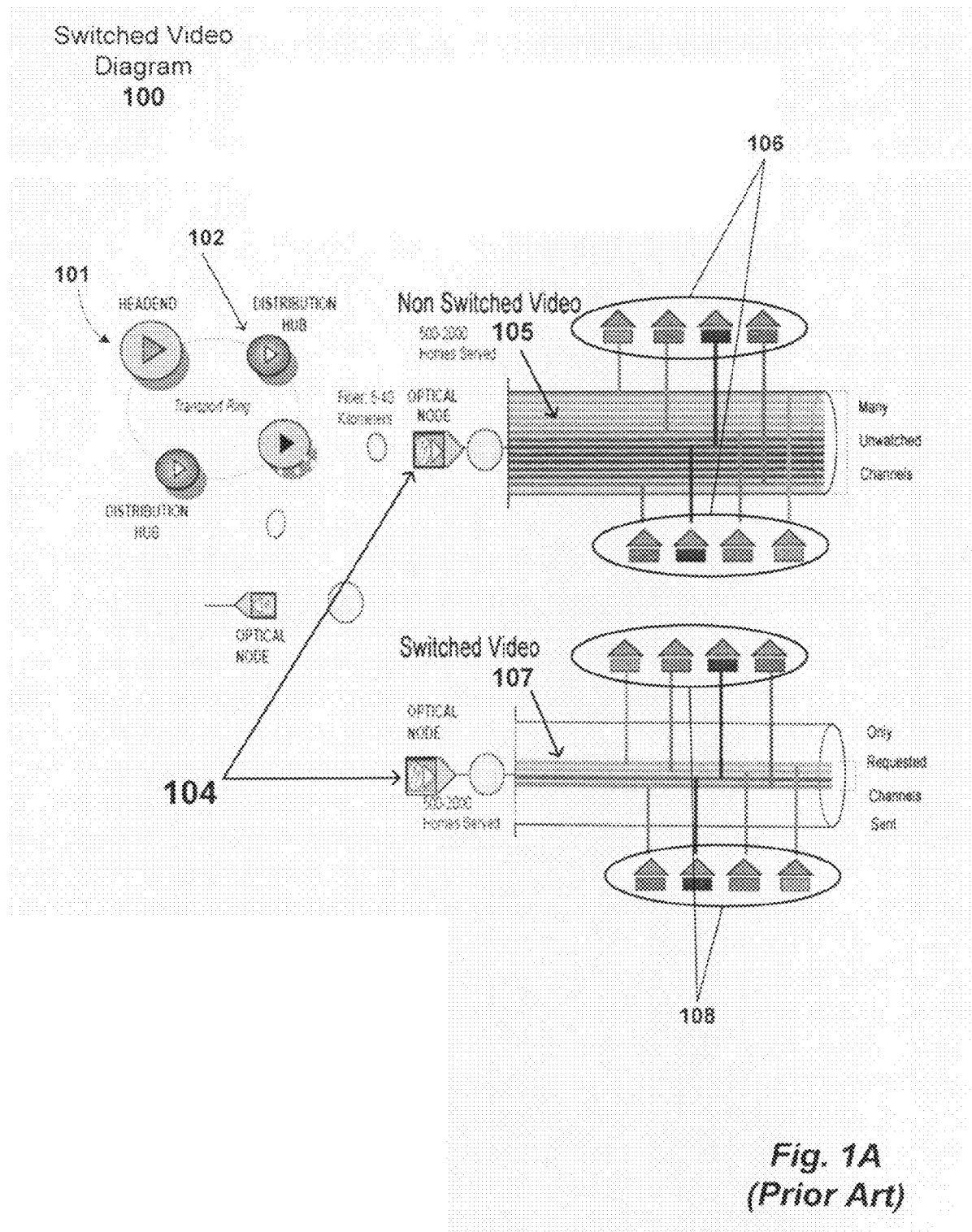
FIG. 1A illustrates a diagram of how switched video saves bandwidth where channels are transmitted via a cable company's coaxial cable.
Figure 1B:
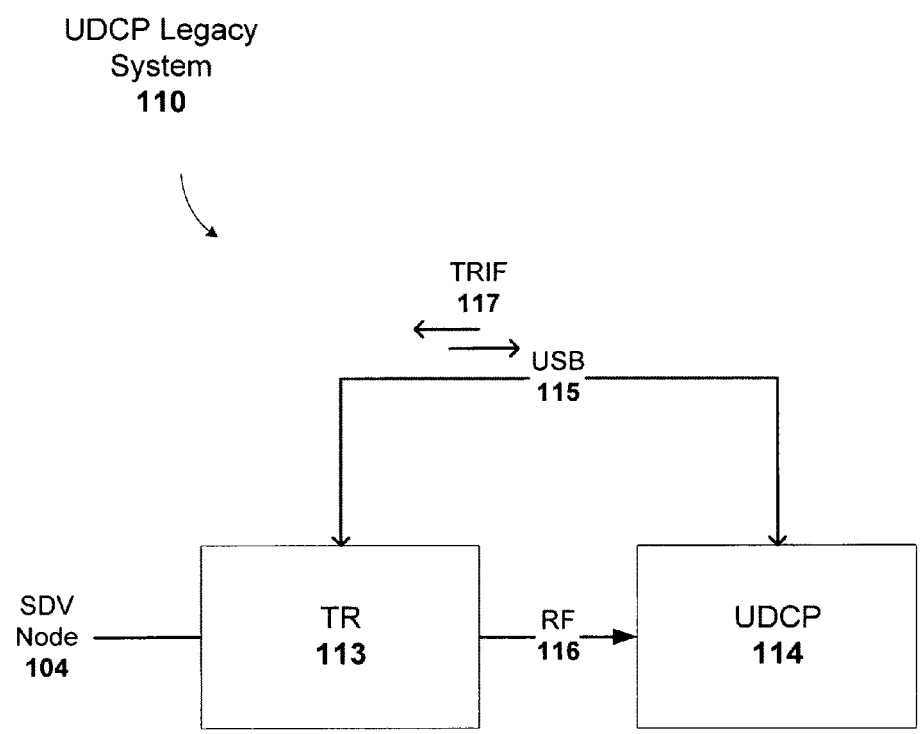
FIG. 1B illustrates a conventional system to enable switched video services on UDCP devices using a Tuning Resolver according to the prior art.
Figure 1C:
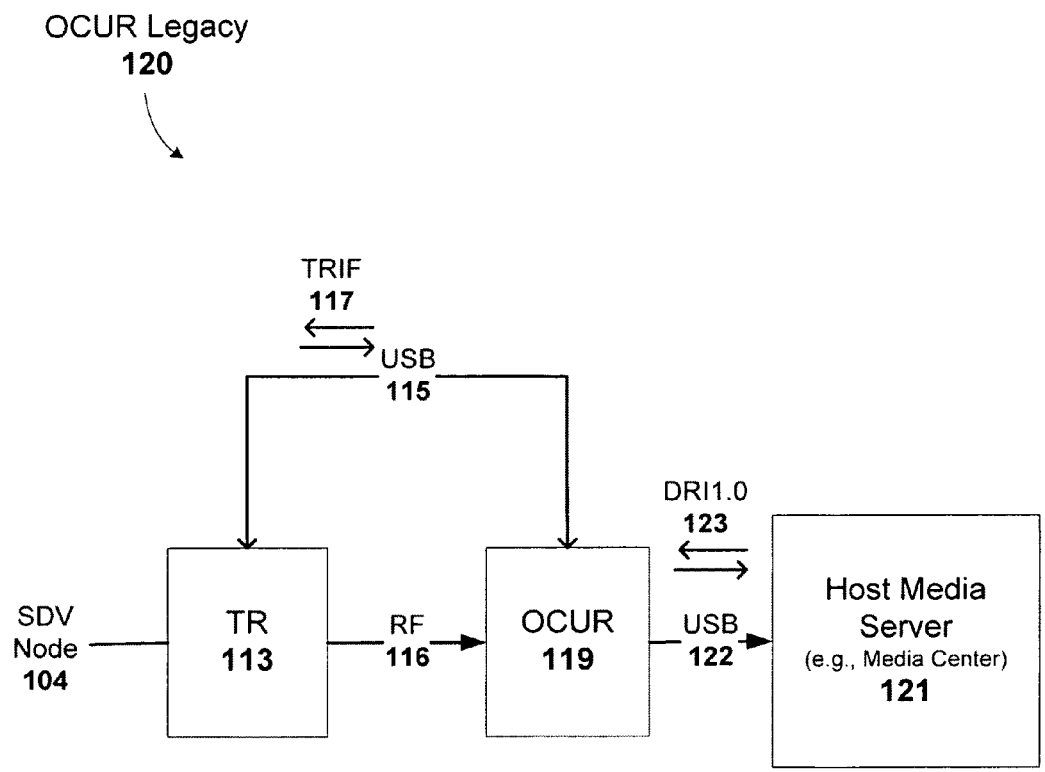
FIG. 1C illustrates a conventional system to enable switched video services on a host media server such as a Media Center PC via an OpenCable Unidirectional Receiver (OCUR) using a Tuning Resolver according to the prior art.

In this embodiment, the TR 113 in FIG. 3 is the same as that illustrated in FIGS. 1B and 1C. Accordingly, TR 113 has two interfaces. The first interface is the RF interface which connects to the node 104 by plugging into the coaxial cable from the node 104. The TR lets the signal on the coaxial cable through to the OCURs 119a and 119b. The OCURs 119a and 119b operate as tuners for the media server 121. The OCURs 119a and 119b receive the input cable RF signals 116 and tune to the corresponding broadcast channel. OCURs 119a and 119b then stream the selected programs via USB 311 and 312 to the media server 121. The RND I/F 316 allows transport of IP datagrams over the USB connections 311 and 312, and the UPNP 317 is used for device discovery and control. The DRI 1.0 drivers 318 and 319 convert the PVR application commands into DRI 1.0 protocol objects and retrieve the selected programs.

In the illustrated embodiment, system 300, TR 113 sits between the network node 104 and the OCUR devices 119a and 119b. TR 113 is connected to the OCURs 119a and 119b via an RF splitter 303. RF splitter 303 operates to split the RF signal 116 into two identical signals for input to OCURs 119a and 119b. This is given by way of illustration and not of limitation as any number of one or more OCUR devices may be connected in line with TR 113 to receive the RF signal 116 and stream selected broadcast channels to the media server 121.

In the illustrated embodiment, each of OCURs 119a and 119b includes an UPnP embedded DRI 1.0 device 306 and 309, respectively. Embedded DRI 1.0 devices 306 and 309 are utilized to stream video and/or audio content of the broadcast received over RNDIS 316 to the media server 121. DRI 1.0 devices 306 and 309 stream the video and/or audio content over the USB connections 311 and 312 with the media server 121. Each of OCURs 119a and 119b further includes TR service 305 and 308, respectively. TR service 305 and 308 may be implemented in embedded software, hardware or a combination of embedded software and hardware. TR service 305/308 is included in OCURs 119a and 119b, respectively, to provide switched video service to the host media server 121. TR service interfaces with the host media server 121 over USB 2 311 and USB n 312, respectively. Messages, such as switched channel requests, are passed from host media server 121 to the DRI1.0 services 306 and 309 located in OCURs 119a and 119b, respectively, over USB 2 311 and USB n 312, respectively. Likewise, echoed messages, such as tune requests are passed from the TR services 305 and 308 located in OCURs 119a and 119b, respectively, over USB 2 311 and USB n 312, respectively. Specifically, in at least certain embodiments, tune requests are passed to a TR Bridge component 315 over USB 2 311 and USB n 312 through USB interface 313. From there, tune requests are received from the USB interface 313 at the TR driver 314 and passed to the TR Bridge 315.

In the illustrated embodiment, the TR 113 has a second interface that connects with the host media server 121. This connection is typically a Universal Serial Bus (USB) connection such as USB 1 310. However, this is given by way of illustration and not of limitation as any number of electrical and/or electro-mechanical connections known in the art may be utilized. In at least certain embodiments, USB 1 310 may be utilized for passing messages between the host media server 121 and the TR 113. The TR 113 is an interpreter device that translates the commands received from the media server 121 over USB 1 310 to the correct protocol that the network node 104 can understand. Additionally, TR 113 receives tune requests over USB 310 1 from USB interface 313 of media server 121 and "resolves" them into tune responses which include switched video channels.

Figure 4:
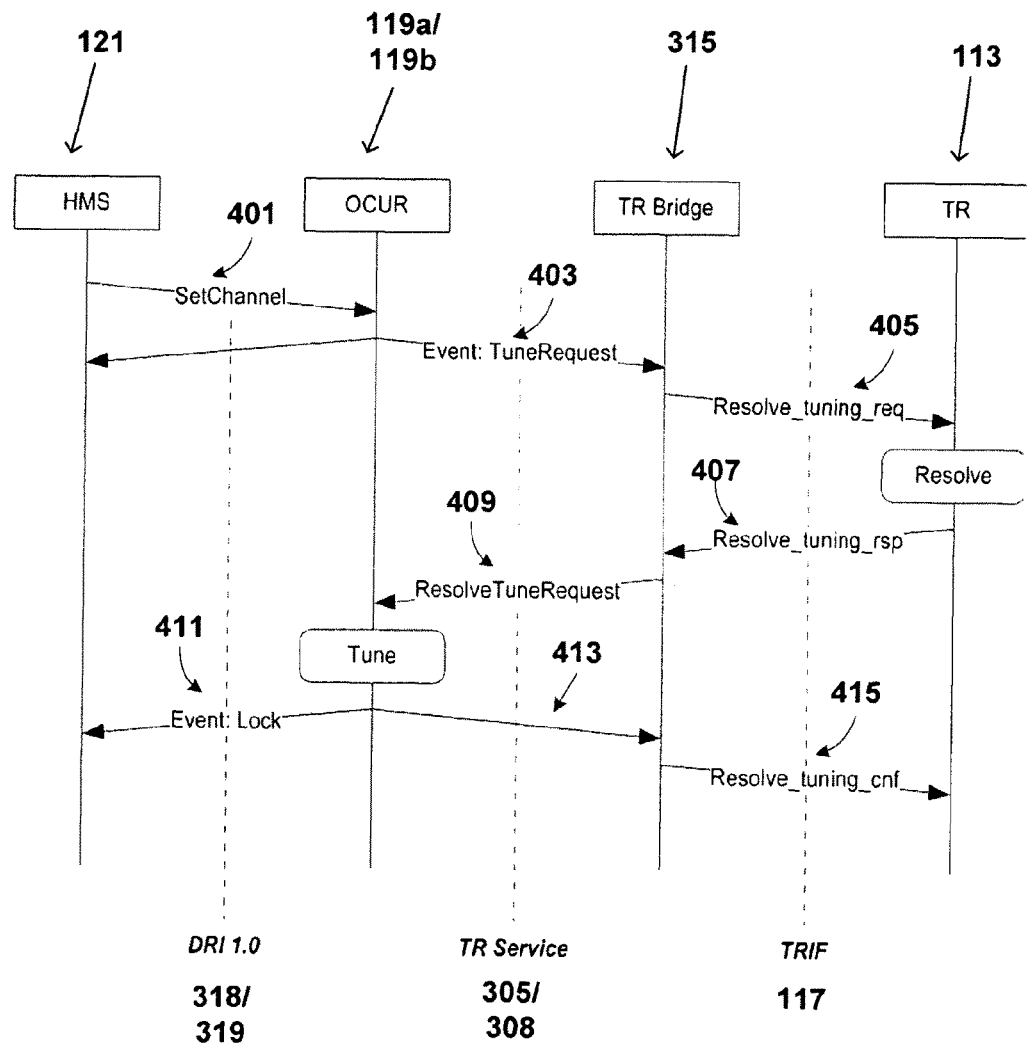
FIG. 4 illustrates an exemplary method for tuning to switched video service on a Host Media Server according to one embodiment of the invention.

FIG. 4 illustrates an exemplary method for tuning to a switched video service on a Host Media Server according to one embodiment of the invention. Exemplary method 400 may be implemented in the exemplary system for enabling switched video service on a Host Media Server of FIG. 3. This method may be performed with OCURs which have not been modified to implement the TRIF specification. Likewise, this method may be performed with media servers which have media software, such as a PVR application 320, which has not been designed to work with switched digital video. Method 400 begins at operation 401 where, in at least certain embodiments, a program request referred to as "setChannel" is sent from the media server 121 to one of the OCURs 119a or 119b. In the switched video environment, the OCURs 119a and 119b are not able to locate the requested program because the OCURs 119a/119b are incapable of two-way communications as discussed above. As a result, the OCURs 119a/119b need to communicate with the TR 113 to locate the requested program from the "setChannel" request received from the media server 121.

Accordingly, control flows to operation 403 where the TR services 305 or 308 of OCURs 119a or 119b, respectively, sends a "tune request" to the media server via USB 2 311 or USB n 312, respectively. The tune request is received by the media server 121 at USB I/F 313 where it is passed to the TR Bridge 315. The TR Bridge 315, in at least certain embodiments, is a service running on the processor of the media server 121 and is provided to established discovery and logical connectivity between the TR device 113 and the OCUR devices 119a or 119b.

Control flows to operation 405. In the illustrated embodiment, the TR Bridge 315 passes communications between the TR services 305 and 308 of OCURs 119a and 119b, respectively, coupled with the media server 121 and the TR 113. In operation 405, the TR Bridge 315 relays the tuning request of operation 403 to the TR 113. Specifically, TR Bridge 315 receives the tuning request from at least one of the OCURs 119a or 119b and sends a "resolve tuning request" to the TR 113 by sending the resolve tuning request to TR driver 314 which passes the resolve tuning request to the USB I/F 313. From there, the resolve tuning request is transmitted over USB 1 310 to TR 113. Once received at TR 113, the TR "resolves" the tuning request. The TR 113 then locates or "localizes" the requested program in the network node 104 and sends a resolve tuning response back to the TR Bridge 315 in step 407. As discussed above, the TR 113 interprets the tuning request from the OCURs 119a/119b into a protocol that the network node 104 can understand. TR 113 then passes this translated message in the proper protocol to node 104. The network node 104 determines what channel within the coaxial cable map (see FIG. 1A) the requested program resides. If the requested program is already allocated (or parked) to a particular channel of the coaxial cable, then the node 104 passes a message back to the TR 113 indicating the channel of the coaxial cable where the requested program resides. If, on the other hand, the requested program is not already allocated to a particular channel of the coaxial cable, then the node 104 allocates a new channel within the available channels of the coaxial cable for the requested program (i.e., parks the requested channel on one of the available coaxial cable channels) and passes a message back to the TR 113 indicating where the requested program resides.

Control flows to operation 407. The TR 113 then passes this information in the form of a tuning response back to the TR Bridge 113. Specifically, the TR 113 sends the tuning response over the USB 1 310 connection to the media server 121 where it is received at USB I/F 313. Thereafter, USB I/F 313 sends the tuning response to the TR Bridge 315 via the TR driver 314.

Control flows to operation 409 where the TR Bridge 315 relays the tuning response to the originator TR services 305 or 308 within OCURs 119a or 119b, respectively, via USB I/F 313 and USB 2 311 or USB n 312, respectively. The TR service 305 or 308 within OCURs 119a or 119b receives the tune response including the location within the channels of the coaxial cable where the requested program resides. The corresponding OCUR 119a or 119b then tunes to the located program.

Control flows to operation 411 where the appropriate one of DRI services 318 or 319 streams the content of the tuned program to the media server 121. Specifically, the appropriate one of the OCURs 119a or 119b streams the selected content through USB 311 or 312 to RND I/F 316 which passes the stream to UPnP 317 so that it can be forwarded to the PVR application 320 via DRI 1.0 drivers 318 or 319, respectively.

Control flows to operation 413 where a first confirmation message is sent from the appropriate one of the TR services 305 or 308 of OCURs 119a or 119b, respectively to the TR Bridge 315 indicating that the channel has been successfully tuned and streamed to the media server 121. Specifically, the first confirmation message is sent over the appropriate one of USB 2 311 or USB n 312 to USB I/F to TR Bridge 315.

Control flows to operation 415 where the confirmation message is echoed from the TR Bridge 315 to TR 113. Specifically, once the confirmation message is received at the TR Bridge 315, the TR Bridge echoed the confirmation indicating that the appropriate channel has been tuned and streamed to the media server 121 via the TR driver 314 where it is passed through USB I/F 313 over USB 1 310 to the TR 113. This completes method 400. In this manner, embodiments of the invention enable switched video services on a host media server working in conjunction with one or more OCUR devices. The methods and apparatuses described herein may be utilized as an efficient way for currently available OCUR devices to take advantage of soon to be released operator TR devices. This methodology may be implemented without the need to replace the OCURs or the host media server software. As such, existing OCUR units may be deployed on switched video markets with limited software upgrades and no changes required to the host media server software.

Figure 5:
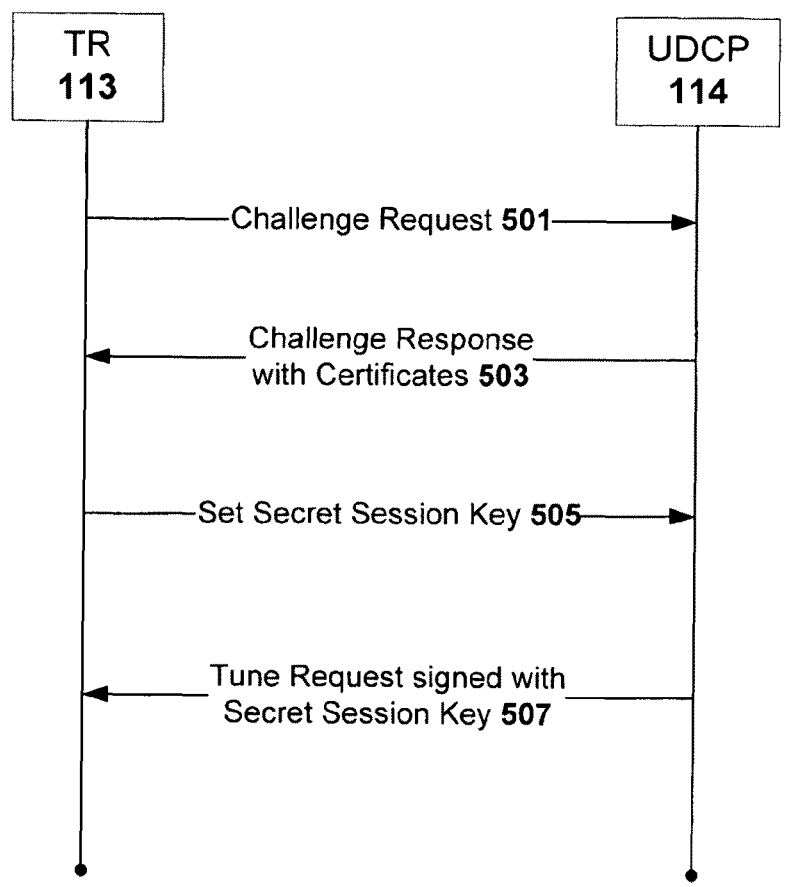
FIG. 5 illustrates a method for providing a secure channel between a Tuning Resolver and a connected Unidirectional Cable Product (UDCP) under the Tuning Resolver Interface (TRIF) specification according to the prior art.

Additionally, embodiments of the invention may be utilized with security measures defined by the TRIF specification. There must be a secure channel between the TR 113 and the one or more OCURs 119a and 119b. The TRIF specification as it is implemented in the prior art allows for only one cryptographic session between the TR and a single UDCP device. FIG. 5 illustrates a method for providing a secure channel between a Tuning Resolver and a connected Unidirectional Cable Product (UDCP) under the Tuning Resolver Interface (TRIF) specification according to the prior art. Method 500 may be implemented in the prior art system to enable switched video services on UDCP devices using a Tuning Resolver of FIG. 1B. According to the TRIF specification, the TR 113 shall establish a trusted relationship with the UDCP 114 prior to resolving its tuning requests. For example, the TR 113 shall send a challenge request protocol data unit (PDU) within five (5) seconds after sending a response to an initialization request from the connected UDCP 114 during initialization if the TR 113 is in an operational state. Additionally, the TR 113 may send unsolicited challenge requests to the UDCP 114 at any time. Method 500 begins at operation 501 where the TR 113 sends a challenge request PDU to the connected UDCP 114. The challenge request shall include every data type that is needed for authentication in a single challenge request. Control flows to operation 503 where the UDCP 114 sends a challenge response within five (5) seconds of receiving the challenge request from the TR 113. The UDCP 114's response includes UDCP 114's host certificate (e.g., UDCP 114's public key) as provided to the CableCard for pairing. A CableCard is a PCM-CIA card distributed by cable providers and inserted into a host device to enable premium services in compliance with the OpenCable specifications.

Control flows to operation 505 where in at least certain embodiments, upon receiving the challenge response (with the public key) from the UDCP 114; the TR 113 must authenticate the UDCP 114's certificate. Upon validation of the UDCP 114's certificate, the TR 113 encrypts a secret session key using the public key of the UDCP 114 certificate and sends the encrypted secret session key to the UDCP 114 within five (5) seconds of receiving the challenge response from the UDCP 114. The secret session key may be, for example, a keyed-hash message authentication code (HMAC) key. An HMAC key is a type of authentication code (MAC) calculated using a cryptographic hash function in combination with a secret key. The TR 113 uses this secret session key to verify the data integrity as well as to verify that the tuning request is coming from the connected and previously authenticated UDCP 114. The connected UDCP 114 may conclude that the authentication has failed it does not receive the encrypted secret session key within five (5) seconds of sending the challenge response to the TR 113.

However, in at least certain embodiments of the invention, for a secure channel to exist between the TR 113 and one or more OCURs 119 of FIG. 3, the authentication must be accomplished through the TR Bridge 315. However, the TR Bridge as an application running on a media server 121 is not entitled to have a certificate which can be validated by the TR 113. As a result, the host media server 121 and the TR Bridge 315 are unable to perform the above security measures and must allow the existing security between the TR 113 and the one or more OCURs 119 to pass through untouched. That is, the security must be provided by the OCUR 119 hardware and the TR Bridge 315 running on the host media server 121 must let this information pass through without altering the authenticated payload.

Figure 6:
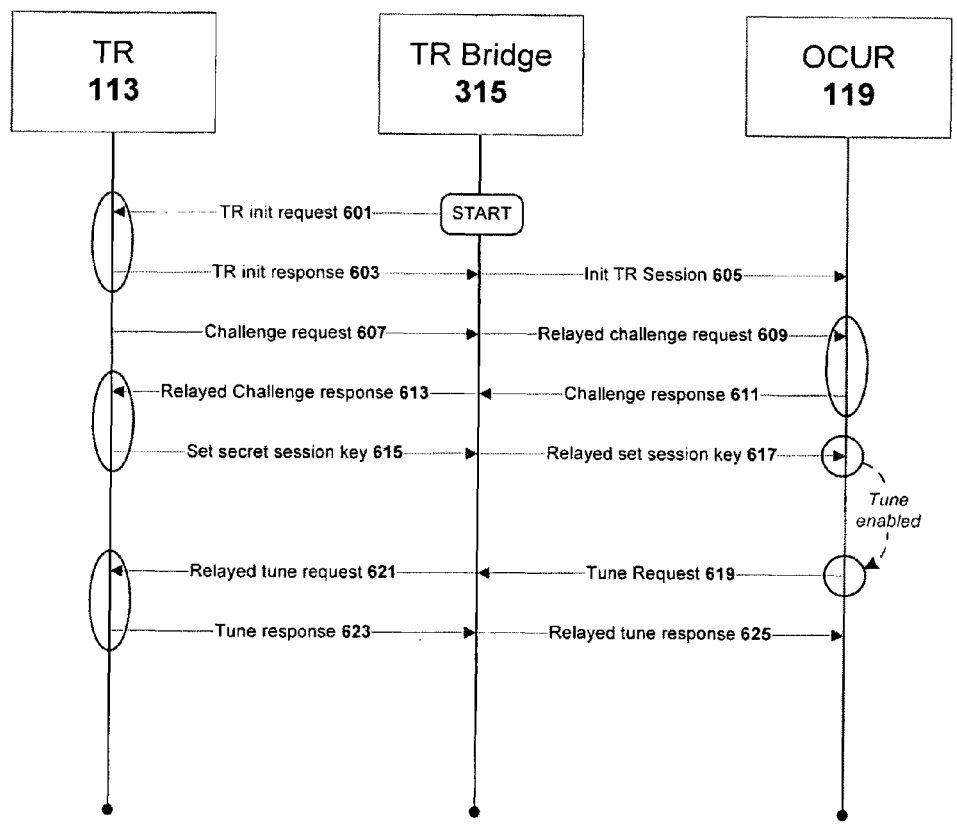
FIG. 6 illustrates an exemplary method for establishing a secure connection between an OCUR tuner and a Tuning Resolver through a TR Bridge application running on a Media Server according to one embodiment of the invention.

FIG. 6 illustrates an exemplary method for establishing a secure connection between an OCUR tuner and a Tuning Resolver through a TR Bridge application running on a Media Server according to one embodiment of the invention. The purpose of the secure connection is to enable the OCUR tuner to send trusted tune request commands to the Tuning resolver. Method 600 may be implemented in the exemplary system for enabling switched video service on a Host Media Server of FIG. 3. Method 600 begins at operation 601 where the TR Bridge 315 initiates a connection with the TR 113. Upon response (operation 603), the TR Bridge 315 notifies the OCUR 119 (operation 605) that a TR is available for service. Within 5 seconds, the TR 113 will send a challenge request (operation 607) to the TR Bridge 315. The challenge request is routed through the TR Bridge 315 as described in method 400 of FIG. 4. This command is relayed to the OCUR 119 (operation 609). When the OCUR 119 responds with its certificates (operation 611) to the TR Bridge 315, the TR Bridge relays the information to the TR 113 (operation 613). After validating the OCUR 119 certificates, the TR 113 creates a secret session key and sends it encrypted with the OCUR 119's public key extracted from the device certificate (operation 615) to the TR Bridge 315. At operation 617, the encrypted secret session key is relayed to the OCUR 119, which as such becomes enabled to send authenticated tune requests. As soon as the OCUR 119 is made aware of the secret session key, it can properly send signed tune request to the TR Bridge 315 (operation 619). The tune request is relayed by the TR Bridge to the TR 113 without change to the authenticated payload (operation 621). The responses from the TR 113 (operation 623) are sent back by the TR Bridge to the OCUR (operation 635).

However, in other embodiments of the invention, multiple tuners may be connected to a single TR 113. FIG. 3 illustrates an example of a system with two (2) connected OCURs 119a and 119b. Currently, the TRIF specification allows for only one (1) cryptographic pairing session between the TR and a connected tuner. The TRIF specification does not cover the case where multiple tuners (OCURs 119) are connected to a single TR. For the case where there are multiple tuners connected to a single TR, there are three (3) possible solutions. The first solution is to modify the TRIF specification to allow for as many cryptographic pairing sessions as there are tuners connected to the TR 113. In this case, there would be a different certificate for each tuner so that multiple tuners could be independently credentialed with the single TR. Any tune request received from any one of the multiple tuners would be routed to the TR 113 as described in method 400 of FIG. 4.

Figure 7A:
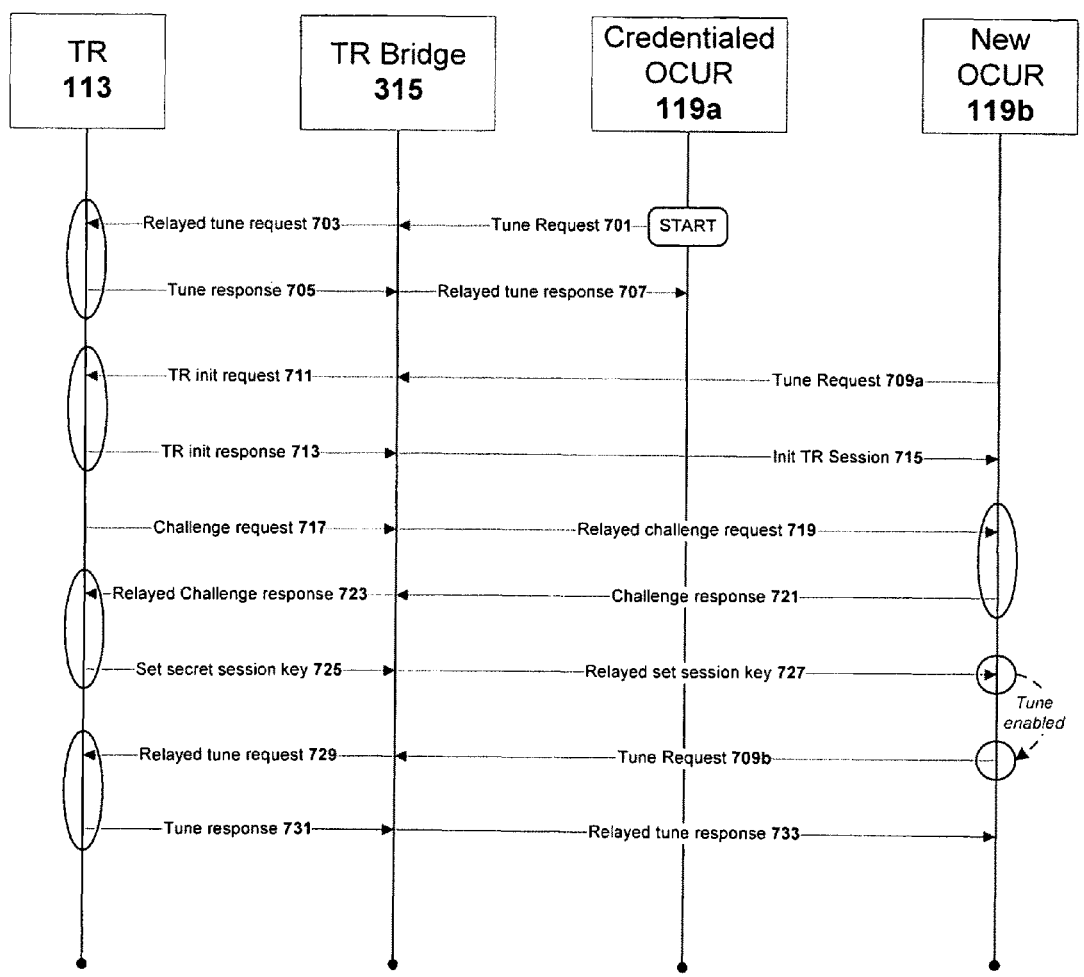
FIG. 7A illustrates an exemplary method for providing channel security between a Tuning Resolver and multiple connected OCUR tuners according to one embodiment of the invention.

The second solution is to switch pairing sessions every time a new tune request is received from a different tuner. For example, if a first tuner, tuner1, is currently credentialed with the TR 113 under a cryptographic session1 and tuner1 sends a tune request to the TR 113, then the tune request is relayed untouched by the TR Bridge 135 to the TR 113. The TR 113 responds accordingly as described in method 600 of FIG. 6. If, on the other hand, a second non-credentialed tuner1 wants to send a tune request to the TR 113, the TR Bridge 135 will reject it, but will start a full initialization cycle with the TR 113 on behalf of tuner 2. The TR 113 then drops session1 with tuner1 and initializes a new session2 with tuner 2. Once, tuner 2 is properly credentialed by TR 113, it will re-send its tune request to the TR 113. This process is shown in FIG. 7A which illustrates an exemplary method for providing channel security between a Tuning Resolver and multiple connected OCUR tuners according to one embodiment of the invention. Method 700A may be implemented in the exemplary system for enabling switched video service on a Host Media Server of FIG. 3.

Method 700A begins at operation 701 with OCUR 119a having already established a secure connection with the TR 113 from the TR 113 through the TR Bridge 315. At operation 701 the credentialed OCUR 119a sends a tune request signed with the session secret key obtained earlier when the OCUR 119a became the credentialed OCUR. The tune request is sent from OCUR 119a to the TR 113. The tune request is routed through the TR Bridge 315 as described in method 400 of FIG. 4. Control flows to operation 703 where the TR Bridge 315 relays the tune request untouched to the TR 113. The TR 113 then receives the relayed tune request. In operation 705, the TR 113 replies with the tune response to the credentialed OCUR 119a. The tune response is routed through the TR Bridge 315 as described in method 400 of FIG. 4. Control flows to operation 707 where the TR Bridge 315 relays the tune response to the OCUR 119a.

At operation 709a, the non-credentialed OCUR 119b sends a tune request to the TR 113. Accordingly in at least certain embodiments, the TR Bridge 315 does not forward the tune request as described in method 400 of FIG. 4, but rather, sends a new initialization request on behalf of OCUR 119b to the TR 113 (operation 711). Upon tune initialization response (operation 713), the TR Bridge 315 notifies the new OCUR 119b (operation 715) that TR 113 is available for service. Within 5 seconds, TR 113 will send a challenge request (operation 717) to the TR Bridge 315. This command is relayed to the new OCUR 119b (operation 719). When the new OCUR 119b responds with its certificates (operation 721) to the TR Bridge 315, the TR Bridge 315 relays the information to the TR 113 (operation 723). After validating the new OCUR 119b's certificates, the TR 113 creates a new secret session key and sends it encrypted with the OCUR 119b's public key extracted from the OCUR 119b device certificate (operation 725) to the TR Bridge 315. At operation 727, the encrypted secret session key is relayed to the new OCUR 119b, which as such becomes the new credentialed OCUR.

From that point on, the newly credentialed OCUR 119b can properly send a signed tune request to the TR Bridge 315 (operation 709b). The tune request is relayed by the TR Bridge 315 to the TR 113 untouched (operation 729). That is, the tune request is relayed by the TR Bridge 315 to the TR 113 without change to the authenticated payload. The response from the TR 113 (operation 731) is relayed by the TR Bridge 315 to OCUR 119b (operation 733). Under this solution and as a consequence, the originally credentialed OCUR 119a has lost the ability to send properly authenticated tune request because the secret session key has been changed. The next tune request attempt from OCUR 119a will trigger a reverse credential translation. There is no limitation to the number of OCURs under this solution.

Figure 7B:
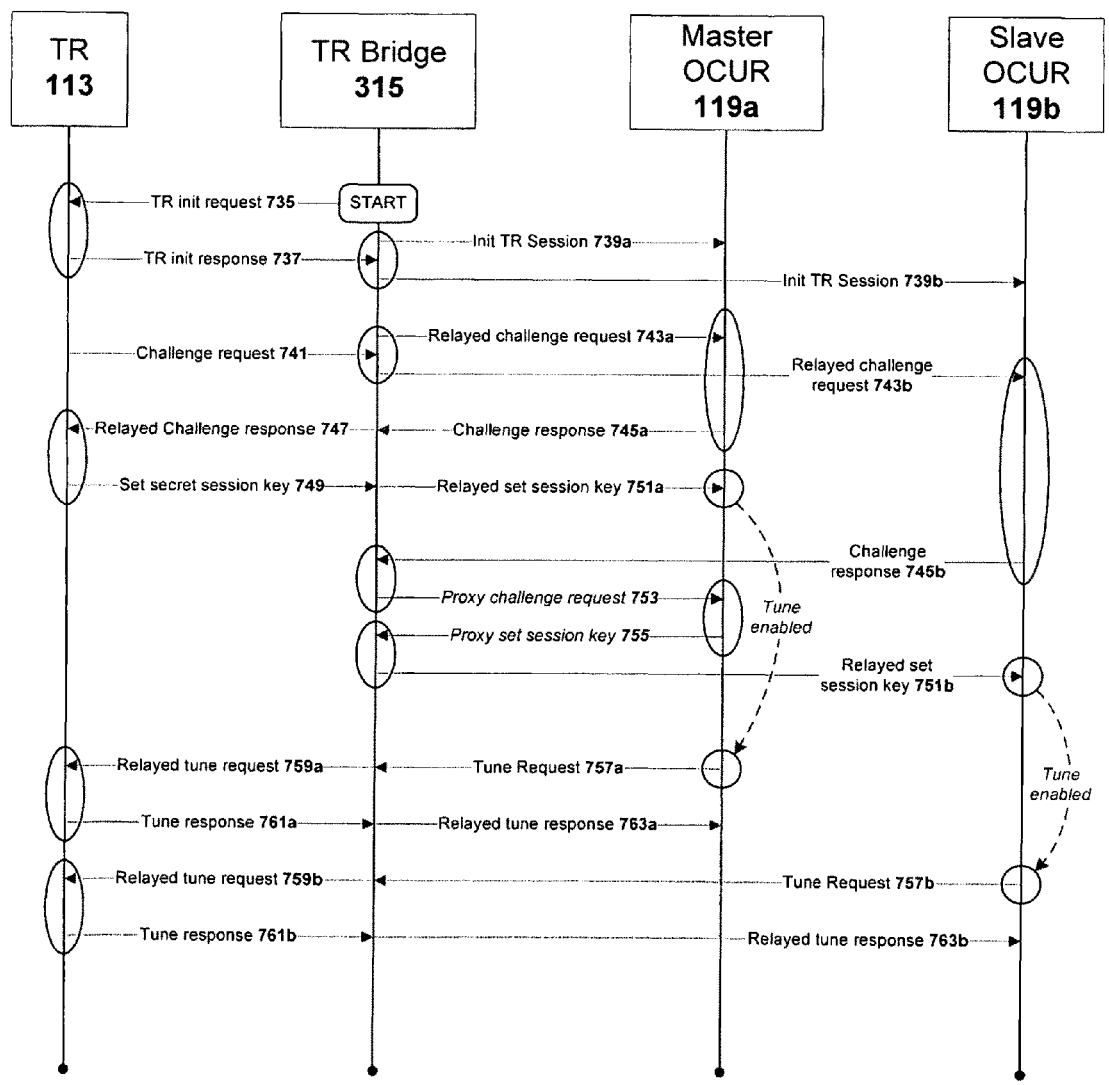
FIG. 7B illustrates an exemplary method for providing channel security between a Tuning Resolver and multiple connected OCUR tuners using a proxy according to one embodiment of the invention.

The third solution is to have one designated OCUR be the master OCUR to act as a proxy for the other OCURs connected to the system. In this configuration, the master (or proxy) OCUR will be the only credentialed OCUR. The master OCUR is responsible for authenticating all slave OCURs for the purpose of sharing with them the current secret session key generated by the TR 113. This process is shown in FIG. 7B which illustrates an exemplary method for providing channel security between a Tuning Resolver and multiple connected OCUR tuners using a proxy according to one embodiment of the invention. Exemplary method 700B may be implemented in the exemplary system for enabling switched video service on a Host Media Server of FIG. 3.

Method 700B begins at operation 735 with the TR Bridge 315 initiating a connection with the TR 113. Upon response (operation 737), the TR Bridge 315 notifies the master OCUR 119a (operation 739a) and the slave OCUR 119b (operation 739b) that TR 113 is available for service. In at least certain embodiments, within 5 seconds, the TR 113 will send a challenge request (operation 741) to the TR Bridge 315. The challenge request is relayed to the master OCUR 119a (operation 743a) and the slave OCUR 119b (operation 743b). When the master OCUR 119a responds with its certificates (operation 745a) to the TR Bridge 315, the TR Bridge 315 relays the information to the TR 113 (operation 747). After validating the master OCUR 119a's certificates, the TR 113 creates a secret session key and sends it encrypted with the master OCUR 119a public key extracted from the master OCUR 119a device certificate (operation 749) to the TR Bridge 315. At operation 751a, the encrypted secret session key is relayed to the master OCUR 119a, which as such becomes enabled to send authenticated tune requests.

At operation 745b, the slave OCUR 119b responds with its certificates (operation 745b) to the TR Bridge 315. The TR Bridge 315 relays the information to the master OCUR 119a (operation 753) and not to the TR 113. Upon receiving the slave OCUR 119b's certificates, the master OCUR 119a performs the same authentication as the one done by the TR 113. If successful, the master OCUR 119a encrypts the secret session key created by the TR 113 with the public key of the slave OCUR 119b extracted from the OCUR 119b's device certificate. At operation 755, the master OCUR 119a sends the encrypted secret session key to the TR Bridge 315. At operation 751b, the encrypted secret session key is relayed to the slave OCUR 119b, which as such becomes enabled to send authenticated tune requests.

As soon as either the master OCUR 119a or slave OCUR 119b have been made aware of the secret session key, they can properly send signed tune request to the TR Bridge 315 (operation 757a or 757b). The tune requests are relayed by the TR Bridge 315 to the TR 113 untouched (operation 759a or 759b). That is, tune requests are relayed by the TR Bridge 315 to the TR 113 without change to the authenticated payload. There is no further need for the master OCUR 119a to be involved in any of the slave OCUR 119b transactions with the TR 113. The responses from the TR 113 (operation 761a or 761b) are sent back by the TR Bridge 315 to their respective OCUR originators (operation 763a for master OCUR 119a, operation 763b for the slave OCUR 119b). There is no limitation to the number of OCUR devices under this solution.

Throughout the foregoing specification, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to bring about such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed description as set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow as well as the legal equivalents thereof.

What is claimed is:

1. A method comprising enabling switched video service on a media server computer using a bridge component in the media server computer to act as an interface between the media server and a switched video network, wherein the bridge component is to relay messages between a set of one or more tuners coupled with the media server and an interpreter device configured to interpret the messages between the set of tuners and a network node that allocates switched video channels over a network, the method further comprising:

relaying a tune request for a switched video channel from at least one of the set of tuners coupled with the media server to the interpreter device over a connection;

receiving a tune response from the interpreter device, the tune response interpreted and relayed from the network node; and relaying the tune response to at least one of the set of tuners, the tune response including the requested switched video channel.

2. The method of claim 1, further comprising receiving a confirmation message from the at least one tuner whenever the requested switched video channel has been tuned and streamed to the media server computer.

3. The method of claim 2, further comprising sending a confirmation message to the interpreter device once the confirmation has been received from the at least one tuner.

4. The method of claim 3, wherein the requested channel is selected by a user from a guide located within the media server computer.

5. The method of claim 4, wherein multiple tuners are coupled with the media server.

6. The method of claim 1, wherein the tune request and the tune response are sent through an interface over a bus connection.

7. The method of claim 6, wherein the interface is a USB interface and the bus connection is a USB bus.

8. A computer-readable non-transitory storage medium implemented in computer hardware that provides instructions, which when executed by a computer, cause the computer to perform the method of claim 1.

9. The method of claim 1, wherein the network node is a fiber optic node.

10. The method of claim 9, wherein the interpreter device is a Tuning Resolver and the tune response is a resolved tune request.

11. The method of claim 10, wherein each of the set of tuners is an OpenCable Unidirectional receiver (OCUR) device incapable of direct communications with the network node.

12. An apparatus comprising:
a media server computer including:
    a processor;
    an interconnect bus;
    a memory coupled with the processor over the interconnect bus;
    a bridge component stored in memory to enable switched video service on the media server computer, the bridge component to relay communications between a set of one or more tuners coupled with the media server and an interpreter device configured to interpret messages between the set of tuners
a first interface to receive tune requests for switched video channels from at least one of the set of tuners over a first connection with the set of tuners;

a second interface to relay the tune requests for switched video channels from the at least one tuner to the interpreter device through a second connection with the interpreter device, wherein the second interface further receives tune responses from the interpreter device over the second connection, the tuner responses interpreted and relayed from the network node that allocates switched video channels, and further wherein the first interface further relays the tune responses to the at least one tuner over the first connection, the tune responses including the requested video channels.

13. The apparatus of claim 12, wherein the first interface to further receive a confirmation message from the at least one tuner over the first connection when the requested video channel has been tuned by the tuner and streamed to the media server.

14. The apparatus of claim 13, wherein the second interface to further relay the confirmation message to the interpreter device over the second connection once the confirmation message has been received from the at least one tuner and wherein the media server computer comprises a storage device to record video from the requested video channel.

15. The apparatus of claim 14, wherein the network node is a fiber optic node.

16. The apparatus of claim 15, wherein the interpreter device is a Tuning Resolver and the tune response is a resolved tune request.

17. The apparatus of claim 16, wherein the tuner is an OpenCable Unidirectional receiver (OCUR) device incapable of direct communications with the network node.

18. The apparatus of claim 14, wherein the first and second interfaces are USB bus interfaces.

19. The apparatus of claim 18, wherein the first and second connections are USB bus buses.

20. The apparatus of claim 19, wherein each requested switched video channel is selected by a user from a guide located in the media server computer.

21. The apparatus of claim 20, wherein multiple tuners are coupled with the media server.

22. An apparatus comprising:
a tuner coupled with a media server computer, the tuner including:
a processor;
an interconnect bus;
a memory coupled with the processor over the interconnect bus to store a service component configured to enable switched video services on the media server,
wherein the service component further comprises a first interface to receive a switched video channel request from the media server over a first connection with the media server, and further
wherein the first interface is further configured to send a tune request corresponding to the received channel request to a bridge component on the media server over the first connection with the media server and to receive a tune response including the requested switched video channel from the bridge component over the first connection with the media server, the tune response relayed from an interpreter device configured to interpret messages from a network node that allocates switched video channels from a network.

23. The apparatus of claim 22, wherein the service component is further configured to instruct the tuner to tune to the requested channel once the tune response is received over the second connection.

24. The apparatus of claim 23, wherein the tuner is to stream content to the media server once the requested channel is tuned.

25. The apparatus of claim 22, wherein the network node is a fiber optic node.

26. The apparatus of claim 22, wherein the interpreter device is a Tuning Resolver and the tune response is a resolved tune request.

27. The apparatus of claim 26, wherein the tuner is an OpenCable Unidirectional receiver (OCUR) device incapable of direct communications with the Tuning Resolver.

\* \* \* \* \*